United States Patent
Piller et al.

(10) Patent No.: US 6,798,644 B1
(45) Date of Patent: Sep. 28, 2004

(54) ESR OF SOLID ELECTROLYTIC CAPACITORS USING CONDUCTIVE POLYMER CATHODES

(75) Inventors: James L. Piller, Simpsonville, SC (US); Philip Michael Lessner, Simpsonville, SC (US); Randolph Stephen Hahn, Simpsonville, SC (US); Carole C. Eppes, Simpsonville, SC (US); Kimberly Lynn Pritchard, Mauldin, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 10/617,156

(22) Filed: Jul. 10, 2003

(51) Int. Cl.$^7$ .............................. H01G 9/04; H01G 9/00
(52) U.S. Cl. ....................................... 361/528; 29/25.03
(58) Field of Search .............................. 361/523–540; 29/25.03

(56) References Cited

U.S. PATENT DOCUMENTS

| | | | |
|---|---|---|---|
| 3,686,535 A | | 8/1972 | Piper |
| 6,304,427 B1 | * | 10/2001 | Reed et al. .................. 361/523 |
| 6,343,005 B1 | | 1/2002 | Tadanobu et al. |
| 6,356,433 B1 | | 3/2002 | Shi et al. |
| 6,368,363 B1 | | 4/2002 | Kobatake et al. |
| 6,391,379 B1 | | 5/2002 | Lessner et al. |
| 6,430,032 B2 | * | 8/2002 | Sakai et al. .................. 361/523 |
| 6,515,848 B1 | * | 2/2003 | Yoshida et al. ............. 361/525 |
| 6,580,601 B2 | * | 6/2003 | Hamada et al. ............. 361/523 |

* cited by examiner

Primary Examiner—Dean A. Reichard
Assistant Examiner—Eric Thomas
(74) Attorney, Agent, or Firm—J. Herbert O'Toole; Nexsen Pruet, LLC

(57) ABSTRACT

A solid electrolytic capacitor with improved ESR before and after mounting on a circuit board is obtained by forming a cathode on a dielectric layer using a conductive polymer, especially an intrinsically conductive polymer. The polymer is then coated with graphetized carbon by dipping in a suspension thereof. After drying, the carbon is infused and coated at least once with a second conductive polymer layer before a conductive paint such as "dipping silver" is applied and the capacitor encapsulated by a transfer molding process. The application of a second conductive polymer layer improves the ESR by filling voids in the carbon layer and improves adhesion of the carbon.

21 Claims, No Drawings

ESR OF SOLID ELECTROLYTIC CAPACITORS USING CONDUCTIVE POLYMER CATHODES

BACKGROUND OF THE INVENTION

1. Objective

The present invention relates to the reduction in ESR obtained by infusing the carbon layer of a solid electrolytic capacitor with an intrinsically conductive polymer.

2. Prior Art

Miniaturization of electronic devices is an important and well established trend in the electronics industry, particularly in the field of computers and telecommunications. Valve metals such as tantalum, aluminum, and niobium are particularly suited for the manufacture of high surface area solid electrolytic capacitors in which the valve metal serves as the anode, and an oxide of the valve metal, formed by anodic oxidation of the valve metal surfaces, serves as the dielectric. In order to maximize the dielectric surface area, and hence increase the volumetric efficiency of the capacitor, the valve metal substrates typically are porous bodies.

Digitization of electronic circuit design has increased the demand for capacitors with high capacitance and low ESR (equivalent series resistance) in the high frequency region. The ability of capacitors to perform their filtering function is limited by the unwanted "parasitic" resistances that result from the use of real-world, non-ideal materials in their construction. These parasitic resistances, collectively known as the finished capacitor's equivalent series resistance (ESR), manifest themselves in the user's electrical circuit as though they were a discrete resistor connected in series with the capacitance of the capacitor. Whereas ideal capacitor elements inherently oppose rapid voltage shifts in the face of changing current, the voltage across resistors changes instantaneously and proportionally to changing current. As a result if a practical capacitor has significant ESR, the resulting instantaneous voltage shifts across the capacitor's ESR, that are proportional to changes in circuit current, undermine the voltage-stabilizing influence of the capacitor. If the ESR becomes too large, the capacitor becomes useless as a filtering device. Traditional solid tantalum, aluminum and niobium capacitors employ manganese dioxide as the primary component of the cathode. Wet aluminum electrolytic capacitors employ a wet electrolyte in the cathode construction.

Early conductive polymers attempted to mimic the properties of metals by using metal or carbon flakes or fibers, with uneven results. Intrinsically conductive polymers were discovered at the University of Pennsylvania in the mid-1970's and the discoveries won the Nobel Prize in 2001. At present, the polymers such as polythiophenes, polypyrroles, polyanilines, polyacetylenes, polydiacetylenes, polynaphthalenes, and their derivatives are finding increased utilization as the primary component of the cathode in solid electrolytic capacitors manufactured from valve metals due in large part to the high conductivity of these materials relative to the more traditional cathode materials. The higher conductivity of intrinsically conductive polymers results in substantial reductions in ESR relative to traditional cathode materials. Low ESR and high capacitance reduces the number of components required to achieve design solutions, resulting in a reduction in board space, as well as reduced cost.

The electronics industry uses automated equipment to place components on a board prior to a solder reflow process which secures the component to the board. The so called 'pick and place' process uses a vacuum chuck to pick the component up and place it in the proper location on a circuit board. The top surface of the component must be flat and smooth in order for the vacuum chuck to reliably manipulate the component. Manufacturers generally encapsulate components using a transfer molding process to provide this flat smooth surface. The transfer molding process subjects the component to therno-mechanical stress.

Following the placement of the component on a circuit board a solder reflow process is generally used to secure the component to the board. During this operation the component is subjected to temperatures above the melting point of solder, in most cases the peak temperature of the solder reflow process exceeds 200° C. and maybe as high as 250° C. This thermal excursion places thermo-mechanical stresses on the component inside the molded case. These thermo-mechanical stresses can cause an increase in the ESR of a solid electrolytic capacitor.

In order to minimize the resistance of the cathode of solid electrolytic capacitors the devices are dipped in a silver paint ("dip silve"), which when dried provides a highly conductive outer coating. Between the primary cathode material and silver layer a carbon layer provides improved ESR stability to therno-mechanical stresses such as encapsulation or board mounting. Although the carbon layer provides improved ESR stability, it increases the path length for conduction of current from the external circuit to the dielectric, thus increasing the device ESR. To achieve a thin carbon layer which resists ESR changes during transfer molding and reflow, the carbon is applied by dipping the device in a suspension of highly graphitized colloidal carbon. The resultant carbon layer is inherently porous, and has a higher resistance than would a fully densified carbon coating. A means of increasing the conductivity of the carbon layer is therefore desirable.

Commercially available carbon suspensions contain graphite particles, a solvent, and a resin to bind the particles together and to the underlying primary cathode material. After dipping in the carbon suspension, the carbon is dried. Although the conductivity of compacted and heated carbon, i.e., graphite, is on the order of 700 Siemens/cm, the conductivity of the dried carbon layer is typically 10–50 Siemens/cm. The lower conductivity of the dried carbon layer is due to the presence of the non-conductive binding resin and microscopic voids between the graphite particles.

Tadanobu et al., U.S. Pat. No. 6,343,005 B1 discloses and claims a solid electrolyte capacitor particularly characterized in that the negative electrode terminal includes a carbon layer to which has been added a catechol or pyrogallol derivative. The patentees teach that 0.2 to 1.2 parts by weight of the derivative per 1 part by weight of carbon particles improves the uniformity of the carbon layer by reducing surface tension of the carbon solution. As a result, contact resistance between the solid electrolyte and the carbon layer is reduced and improved ESR characteristics are obtained in high frequency ranges. No benefit related to the conductivity of the catechol or pyrogallol is asserted, the benefit residing solely in improvements to the quality of the dispersion of the carbon. No polymerization step is disclosed or suggested.

It has been found that when a conductive polymer is applied on a dielectric surface before a carbon layer is applied and the carbon layer is subsequently infused with a conductive polymer the adhesion between cathode layers is increased and the ESR of a solid electrolytic capacitor is improved both after fabrication and after board monitoring.

SUMMARY OF THE INVENTION

It is an object of this invention to improve the conductivity of a carbon layer cathode by infusing it with a conductive polymer, preferably an intrinsically conductive polymer.

It is a further object of this invention to minimize the resistance across the silver, carbon, and primary cathode material layers in a solid electrolytic capacitor.

It is yet another object of this invention to improve the adhesive strength between the carbon layer and the primary cathode material in a solid electrolytic capacitor.

It is a still further object of this invention to produce a solid electrolytic capacitor with low ESR.

It is yet another object of this invention to minimize ESR shifts of a solid electrolytic capacitor during encapsulation and solder reflow.

Finally it is an object of the invention to avoid increase in ESR as a result of humidity during cleaning after mounting and when used in humid climates.

These and other objectives are obtained when a conductive polymer is applied as the first cathodic layer, followed by application of a carbon layer which is then infused with a conductive polymer before being coated with a metal paint prior to connection to a metallic terminal. Intrinsically conductive polymers are preferred for cathode and infusion with carbon and silver is the preferred metal for the metallic paint.

DETAILED DESCRIPTION OF THE INVENTION

A porous pellet is prepared, for example, by pressing a powder and sintering to form a porous body to serve as the anode in a solid electrolytic capacitor. The pellets may be made from any suitable material such as tantalum, aluminum, niobium, hafnium, zirconium, titanium, or compounds and alloys of these elements. Tantalum and niobium are the preferred materials for pressing an anode from powder. Alternatively etched foil may be used as the anode. Aluminum is the preferred material utilized in a foil type construction. The metal sheet is then anodized to form an oxide film over the exposed surface which serves as the dielectric of the capacitor. The surfaces of the anodic oxide film are next coated with a suitable primary cathode material. Manganese dioxide can be applied by dipping the anode body in solutions of manganese nitrate followed by pyrolysis to convert the manganese nitrate to manganese dioxide. Alternatively, the dielectric surfaces can be coated with an intrinsically conductive polymer to serve as the primary cathode material. The dielectric surfaces of solid electrolytic capacitors can be coated with conductive polymers using either an electrochemical or chemical oxidative process.

Three methods have been routinely used to deposit intrinsically conductive polymers on porous tantalum pellet anodes:

1. Chemical oxidative polymerization;
2. Electrolytic oxidative polymerization; and
3. Deposition of a polymer from solution followed by oxidation and/or doping.

A fourth method involves the use of a cross-linking agent to avoid some of the problems encountered when using the above-mentioned traditional methods. A complete explanation of all four methods may be found in U.S. Pat. No. 6,391,379 to Lessner et al., which patent is incorporated herein by reference. After formation of the polymeric cathode layer, components are subsequently dipped in a colloidal, graphitized carbon suspension to coat the external surfaces of the primary cathode material. The process is disclosed in Reed et al., U.S. Pat. No. 6,304,427, incorporated herein by reference. According to prior art processes, the carbon layer is over-coated by dipping the device in a metallic paint, typically silver ("dip silver"). The ESR of the device can be measured at this point in the manufacturing process. The components are subsequently encapsulated using a transfer molding process, at which point ESR can be measured again. The ESR is measured at 100 KHz using a 4 point probe. The measurement is accurate to +/−0.5 m Ω.

This invention adds an additional step to the process described above. After drying of the carbon layer and before dipping in metal paint, a second deposition of conductive polymers is preformed. The polymer may be the same or different from that applied to form the capacitor layer. The conductive polymer serves several functions. Firstly, it fills voids in the carbon to increase the effective density. Secondly, it reinforces the carbon to increase peel strength. As a result of the first two factors, the application of a second conductive polymer decreases ESR after encapsulation and again after reflow when contrasted to prior fabrication methods.

EXAMPLE 1

Pellets of dimensions 4.62×3.25×0.81 mm (0.182×0.128×0.032 inches) were pressed from commercially available capacitor grade tantalum powder. The pellets were sintered to create tantalum anodes with 48,000 CV/g. The pellets were anodized in a phosphoric acid and water electrolyte to 21 volts at 60° C. The pellets were impregnated with poly(3,4-ethylenedioxythiophene BAYTRON m, BAYER AG) using an iron tosylate chemical oxidation process. The parts were dipped in a commercially available carbon suspension formulated to provide low ESR for solid electrolytic capacitors. After drying, the carbon layer was infused with poly(3,4-ethylenedioxythiophene) using an iron tosylate chemical oxidation process. The parts were subsequently dipped in silver paint, attached to leadframes and encapsulated in a transfer molding process. The ESR of the parts was measured after the transfer molding process. The parts then were passed through an IR reflow oven to simulate board mounting at 220° C. in the solder joint (equivalent to ca/245° C. in air). ESR was measured again after the IR reflow step. The ESR data from this experiment is summarized in Table 1.

COMPARATIVE EXAMPLE 1

Pellets from same lot as described in the previous example were dipped in silver paint directly after drying the carbon. Following the silver dip process the parts were attached to leadframes and encapsulated in a transfer molding process as in Example 1. The ESR of the parts was measured after the transfer molding process. The parts were passed through an IR reflow oven to simulate board mounting. ESR was measured after the IR reflow step. The ESR data from this experiment is summarized in Table 1.

TABLE 1

| Reference | ESR After Encapsulation (mΩ) | ESR after IR Reflow (mΩ) |
| --- | --- | --- |
| Example 1 | 20.7 | 22.8 |
| Comparative Example 1 | 22.8 | 25.4 |

As can be seen in Table 1 the process of infusing the carbon layer with a conductive polymer reduced the ESR of the solid electrolytic capacitors both before and after reflow.

EXAMPLE 2

Pellets of dimensions 4.62×3.25×0.81 mm (0.182×0.128×0.032 inches) were pressed from commercially available capacitor grade tantalum powder. The pellets were sintered to create tantalum anodes with 48,000 CV/g. The pellets were anodized in a phosphoric acid and water electrolyte to 21 volts at 60° C. The pellets were impregnated with a poly(3,4-ethylenedioxythiophene) using an iron tosylate chemical oxidation process. The parts were dipped in a commercially available carbon suspension formulated to provide low ESR for solid electrolytic capacitors. After drying the pellets were split into 4 groups. The first group was dipped in silver paint after the carbon dip process. The remaining groups were infused with poly(3,4-ethylenedioxythiophene) using 1, 2, and 3 chemical oxidation process cycles. The parts were subsequently dipped in silver paint, attached to leadframes and encapsulated in a transfer molding process. The ESR of the parts was measured after the transfer molding process. The ESR data from this experiment is summarized in Table 2.

TABLE 2

| Number of Chemical Oxidative Polymerization Cycles After Carbon Step | ESR After Encapsulation (mΩ) |
| --- | --- |
| 0 | 18.6 |
| 1 | 15.8 |
| 2 | 14 |
| 3 | 13.3 |

As evidence by the data in Table 2, the ESR was lower when successive chemical oxidative polymerizations steps were used to fill the voids in the carbon layer.

EXAMPLE 3

Pellets of dimensions 4.83×3.38×0.86 mm (0.190×0.133×0.034 inches) were pressed from commercially available capacitor grade tantalum powder. The pellets were sintered to create tantalum anodes with 40,000 CV/g. The pellets were anodized in a phosphoric acid and water electrolyte to 9 volts at 60° C. The pellets were impregnated with a poly(3,4-ethylenedioxythiophene) using an iron tosylate chemical oxidation process. The pellets were split into 3 groups prior to carbon dipping. The first group was dipped in a carbon formulation #1 having a viscosity of 50 cps. The $2^{nd}$ group was dipped in graphitic carbon formulation #2 at 50 cps. The $3^{rd}$ group was dipped in carbon formulation #2 adjusted to a viscosity of 30 cps.

After drying, the carbon layer was infused with poly(3,4-ethylenedioxythiophene) using a chemical oxidation process. The parts were subsequently dipped in silver paint and attached to leadframes. The parts were mounted in a fixture and a metal stud was attached to the coating using an adhesive. The metal stud was drawn perpendicularly to the coating to measure the strength of adhesion between the external layers of the unencapsulated capacitors. The parts were subsequently processed through a transfer molding process and the ESR was measured. The data from this experiment is summarized in Table 3.

COMPARATIVE EXAMPLE 2

Pellets from each of the 3 groups described in the previous example were dipped in silver paint directly after drying the carbon. Following the silver dip process the parts were attached to leadframes. The parts were placed in a fixture for measuring the adhesive strength between the external layers of the solid electrolytic capacitor as described above. The parts were subsequently processed through a transfer molding process and the ESR was measured. The data from this experiment is summarized in Table 3.

TABLE 3

| Carbon Type | Carbon Viscosity | Post Carbon Polymerization Cycle (Y/N) | Peel Strength (g) | ESR After Encapsulation (mΩ) |
| --- | --- | --- | --- | --- |
| #1 | 50 | No | 409 | 12.5 |
| #1 | 50 | Yes | 440 | 11.0 |
| #2 | 50 | No | 345 | 13.1 |
| #2 | 50 | Yes | 451 | 11.9 |
| #2 | 30 | No | 398 | 11.5 |
| #2 | 30 | Yes | 416 | 10.0 |

The particle size distribution of the graphite in carbon type #1 generates a carbon layer with less void space between graphite particles than carbon type #2. The result is lower ESR for carbon formulation #1 relative to formulation #2. The data in Table 3 indicate that even with the tighter packing of carbon formulation number 1, the process of infusing the carbon layer with conductive polymer reduces ESR and improves the adhesive strength of the cathode interfaces. Reducing the viscosity of the carbon reduces the thickness of the carbon layer and also results in lower ESR as evidenced by the data in Table 3. Even at low carbon viscosities the process of infusing the carbon layer with conductive polymer reduces ESR and improves the adhesive strength of the cathode interfaces as evidence by the data in Table 3.

COMPARATIVE EXAMPLE 3

Pellets of dimensions 4.04×3.10×1.37 mm (0.159×0.122×0.054 inches) were pressed from commercially available capacitor grade tantalum powder. The pellets were sintered to create tantalum anodes with 48,000 CV/g. The pellets were anodized in a phosphoric acid and water electrolyte to 20 volts at 60° C. The pellets were impregnated with a poly(3,4-ethylenedioxythiophene) using an iron tosylate chemical oxidation process. The parts were split into 2 groups. One of the groups was dipped in a commercially available carbon suspension formulated to provide low ESR for solid electrolytic capacitors, the second group was not dipped in a carbon suspension. Both groups were subsequently dipped in silver paint. The ESR and dimensions of each group were measured at this point. The parts were subsequently attached to leadframes and encapsulated in a transfer molding process. The ESR of the parts was measured after the transfer molding process. A sample from each group was mounted on substrates during a solder reflow operation and the ESR was measured. This data is summarized in Table 4.

TABLE 4

| Carbon (Y/N) | Thickness (inches) | Width (inches) | ESR Prior to Encapsulation (mΩ) | ESR After Encapsulation (mΩ) | ESR After Mounting (mΩ) |
| --- | --- | --- | --- | --- | --- |
| Yes | 0.125 | 0.064 | 32.8 | 27.5 | 26.7 |
| No | 0.123 | 0.061 | 28.6 | 30.1 | 41.3 |

The data in Table 4 demonstrate the effect of an increase in thickness and width of the unencapsulated capacitor due to the carbon layer. The ESR prior to encapsulation is lower for the group processed without a carbon dip due to the decrease in path length for current to reach the dielectric surfaces of the capacitor. However, after the thermo-mechanical stresses of encapsulation, the ESR is significantly higher for the group processed without a carbon layer. The ESR for the group processed without a carbon layer exhibited a further substantial increase in ESR when subjected to the thermo-mechanical stresses of a surface mount process. This data indicates why elimination of the carbon layer is not an option for reducing ESR.

EXAMPLE 4

The bulk resistivity of the carbon was measured by laying down a 1.27×6.35 mm (0.5 inch×2.5 inches) sample of carbon on a glass slide. After drying the carbon the resistance of the carbon is measured using a 4 point probe method. The thickness of the carbon is measured and the bulk resistivity was calculated to be 0.074 ohm-cm (13.5 S/cm). The sample was subsequently infused with conductive polymer using a chemical oxidative process. The resistance was measured and the resistivity recalculated. After infusing the carbon layer with conductive polymer the resistivity dropped to 0.019 ohm-cm (52.6 S/cm).

EXAMPLE 5

Pellets were processed as described in previous examples through carbon dipping. The pellets were split into 2 groups, one of which was processed through a chemical oxidation process to infuse the carbon layer with poly(3,4-ethylenedioxythiophene). The second group of pellets served as controls for the experiment and was not so treated. Pull test measurements were made at 100° C. in order to determine the strength of the external conductive polymer/carbon layers of the pellets. The average pull strength of the control group was 59 grams with the break occurring in the carbon layer. The average pull strength of the group infused with a conductive polymer after the carbon dip was 284 grams. These breaks occurred largely in the neighborhood of the carbon-polymer interface. Thus the strength of the polymer-carbon layers was greatly enhanced by infusing the carbon layer with conductive polymer.

EXAMPLE 6

Poly(3,4-ethylenedioxythiophene) was formed on the internal and external surfaces of a lot of commercially available etched and formed aluminum foil via a chemical oxidation process. A carbon layer was applied to the aluminum elements using a conventional dip and dry process. The lot was split into two groups. The carbon of the test group was infused with poly(3,4-ethylenedioxythiophene) using a chemical oxidative process. Both groups were subsequently dipped in silver paint. The elements were glued to leadframe and encapsulated in a transfer molding process with 4 elements in each encapsulated device. After encapsulation the ESR of the test group was 7 milliohms. The ESR of the control group was 12 milliohms.

It is apparent to those skilled in the art that variations and modifications can be made in the compositions and methods of the present invention without departing from the scope of the invention as disclosed and claimed.

What is claimed:

1. A solid electrolytic capacitor consisting essentially of:
    a) a valve metal operably attached to a metal lead;
    b) a dielectric formed on the surface of said valve metal;
    c) a first conductive polymer formed on the surface of said dielectric;
    d) a conductive carbon layer coated onto said conductive polymer;
    e) a second conductive polymer formed on and infused into said conductive carbon layer;
    f) a conductive metal paint coated onto said second conductive polymer;
    g) a conductive leadframe attached to said conductive metal paint; and
    h) an encapsulating polymeric insulating coating exposing only said metal lead and said conductive leadframe.

2. A solid electrolytic capacitor according to claim 1 wherein said valve metal is selected from the group consisting of tantalum, aluminum and niobium.

3. A solid electrolytic capacitor according to claim 2 wherein said valve metal is a sintered tantalum.

4. A solid electrolytic capacitor according to claim 1 wherein the dielectric formed on the surface of the valve metal is the oxide of the valve metal.

5. A solid electrolytic capacitor according to claim 1 wherein at least one of said first and second conductive polymers is an intrinsically conductive polymer.

6. A solid electrolytic capacitor according to claim 5 wherein both of said first and second conductive polymers are an intrinsically conductive polymer.

7. The solid electrolytic capacitor according to claim 6 wherein said first and second intrinsically conductive polymers are the same.

8. A solid electrolytic capacitor according to claim 6 wherein said first and second intrinsically conductive polymers are different.

9. A solid electrolytic capacitor according to claim 6 wherein said intrinsically conductive polymer is selected from the group consisting of polythiophenes, polypyrroles, polyanilines, polyacetylenes, polydiacetylenes, polynaphthalenes and derivatives thereof.

10. A solid electrolytic capacitor according to claim 9 wherein said intrinsically conductive polymer is a polythiophene.

11. A solid electrolytic capacitor according to claim 9 wherein said polythiophene is poly (3,4-ethylenedioxythiolene).

12. A solid electrolytic capacitor according to claim 1 wherein said conductive carbon layer is a highly graphitized carbon.

13. A solid electrolytic capacitor according to claim 1 wherein said conductive metal paint is a silver paint.

14. A solid electrolytic capacitor according to claim 1 wherein said encapsulating polymeric insulating coating is an epoxide.

15. A method for making a solid electrolytic capacitor consisting essentially of the steps of:
    a) forming a valve metal pellet by pressing and sintering a powder of a valve metal;
    b) attaching a conductive lead to said pellet;
    c) anodizing said valve metal pellet to form a dielectric oxide on the surface of said valve metal;
    d) forming a first conductive polymer on the surface of said dielectric oxide by polymerization of a monomer thereof;
    e) dipping said polymer coated pellet into a suspension of carbon and drying to produce a carbon coated pellet;
    f) forming a second conductive polymer In and on said carbon coated pellet by polymerization of a monomer thereof;
    g) dipping said polymer coated pellet Into a paint containing a conductive metal powder;
    h) attaching a leadframe to said paint; and
    i) encapsulating said painted pellet in a dielectric polymeric coating.

16. A method according to claim 15 wherein the forming of the first and second conductive polymers is by chemical oxidation of monomers.

17. A method according to claim 16 wherein the monomers are thiophenes.

18. A method according to claim 17 where the monomer is 3,4-ethylenedioxythiophene.

19. The method according to claim 16 wherein the oxidant is iron tosylate.

20. A method according to claim 15, wherein the step of forming a second conductive polymer is repeated.

21. The method according to claim 15 wherein the paint containing a conductive metal powder is silver paint.

* * * * *